March 6, 1962 — T. J. WILLIAMS — 3,023,536
FISHHOOK
Filed July 8, 1958

*INVENTOR.*
THOMAS J. WILLIAMS
BY Robert H. Jacob
AGENT

United States Patent Office 3,023,536
Patented Mar. 6, 1962

3,023,536
FISHHOOK
Thomas J. Williams, 720 Southmeade Parkway,
Nashville, Tenn.
Filed July 8, 1958, Ser. No. 747,154
5 Claims. (Cl. 43—43.2)

This invention relates generally to fishhooks and more particularly to improved fishhooks adapted for use independently with natural baits or in combination with suitable artificial lures and characterized by a high resistance to snagging when retrieved over underwater obstructions, such as limbs, roots, brush, rocks and the like.

As is well known to those who enjoy the sport of fishing, it is particularly vexatious to snag one's hook, lure and the like upon hidden or submerged obstacles. Not only does snagging cause an annoying loss of fishing time, it frequently causes the fisherman to loose his bait, hook, leader and all.

The present invention proposes to overcome the difficulties resulting from a snagged hook with a novel and improved fishhook characterized by unique positional relationships between portions of its shank, and its bend, relative to the point of its hook which substantially preclude the hook from snagging underwater obstacles while being retrieved therethrough. Thus a hook is provided which may be readily used along shore lines, on lake bottoms, and in like obstructed areas without fear of encountering the problems normally incident to casting in such areas.

The known prior art for achieving weedless and/or non-snagging fishhooks includes two general approaches. One approach is to provide the bend of the hook with considerable inward curve (point toward the shank) so as to close the gap and reduce the portion of the hook in which obstructions can become lodged. This is disadvantageous because it greatly reduces the kind of fish upon which the hook is effective.

A second approach is to provide a resilient guard which extends downwardly from the shank over the point. While this is successful in diverting weeds, branches and the like from ensnaring the hook, it provides a delicate structure which is difficult to fabricate, costly to manufacture and fragile in use (the guards frequently break off with but slight mishandling). In addition, such guards are subject to the further disadvantage that they frequently warn fish away from the bait when the fish bumps the guard in approaching the hook.

The present invention proposes to achieve the non-snagging characteristic heretofore described in a novel but simple manner which enables hooks having any desired gap to be so characterized and completely obviates the delicate attachment of resilient guards and other auxiliary appendages to the hook. The results of the present invention, which are equally obtainable irrespective of whether straight or kirbed and reversed hooks are desired, are realized by providing the fishhook with a novel angular relationship intermediate adjacent shank portions and intermediate the shank portions adjacent the bend and the bend.

Accordingly, one of the prime objects of the present invention is to provide an improved fishhook which is readily usable with either natural or artificial baits in areas of extremely congested underwater obstructions because of its inherent resistance to snagging upon such obstructions resulting from a novel arrangement of its several portions.

Still another object of the present invention is to provide an improved fishhook of the type described in which a novel angular relationship between portions, of its shank and its bend enables the hook to override underwater obstructions encountered thereby without becoming snagged thereupon.

A still futrher object of the present invention is to provide a fishhook of the type described in which a relatively open gap between the point and shank is protected from snagging by the coaction of a biangular shank and an angular bend and which, upon encountering underwater obstacles, coacts with a line or sinkered line attached thereto to depress the eye end of the hook and elevate the point end into non-snagging relationship with the obstacle irrespective of the nature or type of underwater obstacle encountered.

Still another object of the present invention is to provide an improved non-snagging fishhook which is easily manufactured and does not require the attachment of extra appendages and the like in order to realize a non-snagging characteristic.

These and still further objects as shall hereinafter appear are fulfilled by the present invention in a manner easily discerned from the following detailed description when read in conjunction with the accompanying drawing illustrating an exemplary embodiment of this invention and in which.

Figure 5:
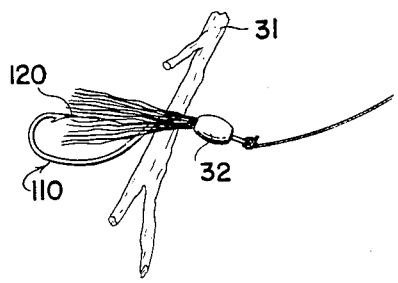
Figure 6:
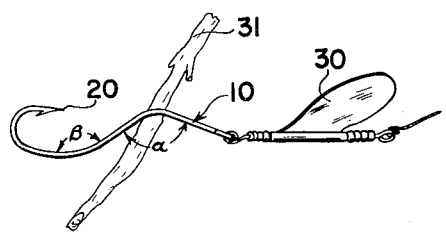

FIG. 5 is a perspective showing of a fishhook embodying the present invention with an artificial lure after it has turned itself into a non-snagging position upon engagement with and relative to an underwater obstacle; and FIG. 6 is a perspective showing of a fishhook embodying the present invention with a spinner attachment after it has turned itself into non-snagging position after engagement with and relative to an underwater obstacle.

In the drawing, in which like portions bear like reference characters throughout the several views, a straight fishhook embodying the present invention is indicated by the general reference numeral 10.

Figure 1:
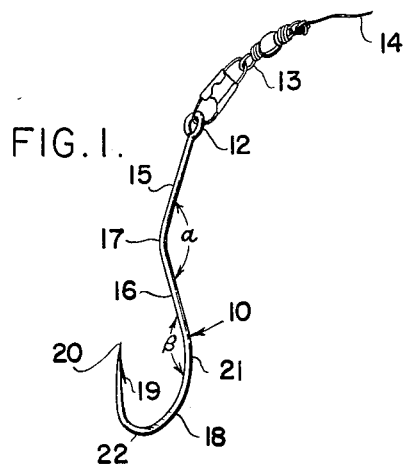
FIG. 1 is a perspective showing of a fishhook embodying the present invention.
Figure 2:
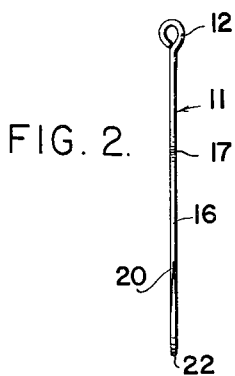
FIG. 2 is a frontal elevation of the fishhook of FIG. 1.

Referring to FIGS. 1 and 2, a hook 10 comprises a generally rounded shank 11 terminating in an eye 12. The eye 12 is adapted to be attached to a snap-swivel 13 which in turn is joined to a leader 14 connected at its upper end to a suitable sinker and line (not shown).

As shown in the drawing an important feature of the present invention, shank 11 comprises an upper substantially straight portion 15 and a lower substantially straight portion 16 angularly disposed relative to each other and defining therebetween an angle α, the special significance of which will be more fully explained.

Shank portion 16 extends downwardly away from the apex 17 of angle α and merges into a curved bend 18 which in turn extends therefrom to the bottom of a barb 19 extending downwardly in the general direction of the bend 18 from a point 20.

Bend 18 comprises a relatively flat portion 21 and a curved bottom portion 22. Bend flat portion 21 merges with lower shank portion 16 to define therebetween an angle β, the special significance of which will be more fully explained.

Angle α, the angle defined between shank portion 15 and shank portion 16, lies in a common plane with the remaining hook structure, i.e., shank 11, bend 18 and point 20. Satisfactory results are obtained in the practice of the present invention when angle α is between about 120° to about 160° and preferred results are obtained when angle α is between about 120° and about 145°.

Angle β, the angle defined between shank portion 16 and bend portion 21, is related to the magnitude of angle α and preferred results are obtained when angle β is from about 15° more than angle α to substantially equal to angle α. It has been found that when angle β is more than 15° greater than angle α the results of the present invention will be provided with respect to the conditions of obstruction hereinbefore enumerated but that other aspects of preferred fishhook design, i.e., gap, length of bite, lines of retracting thrust, etc., will suffer. Thus my tests indicate that, when these teachings are observed, this invention may incorporate other ancillary benefits in addition to its specific contribution.

Thus, as stated, the embodiment of FIGS. 1 and 2 shows the incorporation of the present invention into the so-called "straight hooks," i.e., those hooks in which the hook, bend, and shank lie in a common plane.

Figure 3:
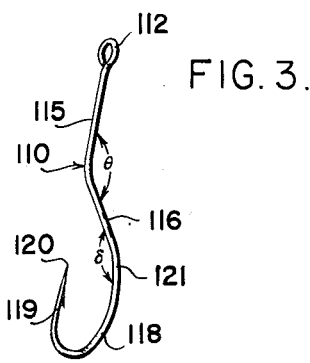
FIG. 3 is a perspective showing of an alternative embodiment of the present invention.
Figure 4:
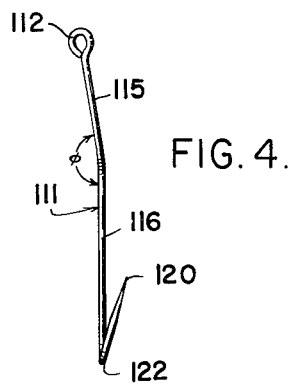
FIG. 4 is a frontal elevation of the fishhook of FIG. 3.

An alternative embodiment of the present invention is shown in FIGS. 3, 4 and 5 and comprises a hook 110 having a so-called "kirbed or reversed" bend, i.e., a bend in which the portion between the point and the bottom is inclined relative to the portion between the bottom portion and the shank at about 20°.

Generally, hook 110 comprises a shank 111, an eye 112, a curved bend 118, a barb 119 and a point 120 arranged in the same general relationship to each other as are the corresponding parts of hook 10.

Specifically, see FIGS. 3 and 4, hook 110 comprises a shank 111 terminating in an eye 112 at one end and having an upper substantially straight portion 115 and a lower substantially straight portion 116 angularly disposed relatively to each other in each of two planes. Thus, in the plane represented by FIG. 3, i.e., the side plane, shank portions 115, 116 define an angle θ therebetween generally corresponding in magnitude to angle α of hook 10. In the plane represented by FIG. 4, i.e., the frontal plane, shank portions 115, 116 define therebetween an angle φ equal to from about 150° to about 175°.

In practice it has been found that desirable results are obtained when angle θ equals from about 120° to about 160° and angle φ is at least sufficiently inclined to permit a projection of the plane of shank portion 115 to pass clear of point 120. It has been found that for most of the conventional hooks having kirbed or reversed bend, an angle φ, on the side of shank 111 opposed from point 120, of from 150° to 175° will provide quite satisfactory results.

In the embodiment of FIGS. 3 and 4, another angle δ is formed intermediate shank portion 116 and straight portion 121 of bend 118 generally corresponding to angle β of the embodiment of FIGS. 1 and 2 and for the purposes ascribed thereto. In practice, quite satisfactory results are obtained when angle δ is about 15° more than angle θ, up to substantially equal to angle θ, or from about 155° up to about 165°.

Considering when hooks 10, 110 are used with natural or artificial baits, as shown in FIGS. 5 and 6, the hooks possess substantially total resistance to snagging by virtue of the significant interrelationship of the angles α, β and θ, δ and φ respectively.

Thus when an angler retrieves the fishhook of this invention (or a lure made with this hook) over underwater limbs, roots or ther obstructions, indicated as 31 in FIGS. 5 and 6, the eye 12, 112 passes over the obstacle and shank portion 15, 115 rides on top of the obstruction. As the curved portion of the shank 11, 111 reaches the top of the obstruction, the weight of the hook combined with coaction of the aforesaid angles causes point 20, 120 to turn upward and the hook 10, 110 is retrieved over the limb or obstacle without snagging.

When hook 10 is used with a suitable lure (such as spinner 30 shown in FIG. 6), it readily resists snagging upon an obstruction 31 or other underwater obstacle because of the coaction of the several members of its novel design. Thus, as hook 10 approaches obstruction 31 in the plane of angle α, the interior surface of shank 11 engages the obstacle 31 and rides thereover until obstruction 31 is engaged within angle α to provide a fulcrum action whereby point 20 is raised clear of the obstruction and hook 10 passes freely therepast.

If the hook 10 engages obstruction 31 along other than the plane of angle α, the novel configuration of hook 10 and the rounded stock from which the shank portions are made causes the hook to roll into the plane of angle α and pass thereover in the manner described above.

When hook 110 is used with a suitable lure (such as fly 32 shown in FIG. 5) and is being retrieved from a cast, it resists snagging upon obstruction 31 by the cooperative action of its several members. Thus as hook 110 approaches obstruction 31 in the plane of angle θ, the interior surface of shank 111 engages obstacle 31 and rides thereover until obstruction 31 is engaged within angle θ to provide a fulcrum action whereby point 120 is raised clear of the obstruction and hook 110 passes freely therepast.

Similarly, when hook 110 encounters obstacle 31 in the plane of angle φ, hook 110 is rolled into the plane of angle θ whereby hook 110 passes clear of obstruction 31 in the manner described above.

Thus, as can be readily seen, the novel relationship of the several portions of the shank to each other and to other portions of the hook, a new fishhook is provided which readily fulfils all of the objects of this invention as previously set forth.

In the course of the preceding description the following terms have been used and are intended to convey the following meanings:

The "eye" of the hook is that portion which provides means for attaching the hook to fish lines, artificial baits and the like and is intended to include any of the conventional fastening means such, for example, as ringed hooks, eyed hooks, turned up tapered eyes, turned down tapered eyes, turned up ball eyes, turned down ball eyes, and the like;

The "bend" of the hook is the bottom curved portion disposed intermediate the "point" and the "shank";

The "point" of the hook is the sharp, penetrating projection at the end of the hook remote from the eye and tapers back into a "barb" which prevents the hook from being easily withdrawn once penetration has been effected;

The "shank" of the hook is the body portion of the hook extending between the eye and the bend;

The "bite" of the hook is the distance from the point to the bottom of the bend and is a measure of the distance which the hook may penetrate into an object it has engaged; and The "gap" of the hook is the distance or clearance between the point and the shank.

It is of course understood that while an embodiment and several modifications thereof have been herein described, the present invention is not so limited but rather includes all structures embodying the spirit of the present invention, especially as defined in the claims appended hereto.

What is claimed is:

1. A fishhook structure comprising a shank, means at one end of said shank for attaching the structure to auxiliary equipment, a hook at the other end of said shank, said hook having a rearwardly extending barb end arranged to one side of said shank, said shank comprising a convex portion lying in a first plane interconnected with a concave portion lying in a second plane, said concave portion facing the barb end of said hook, the part of said shank interconnecting said convex and concave portions of said shank lying in a first line which intersects with a second line passing through the part of said convex portion of said shank interconnected with said attachment means in a first obtuse angle, the part of said hook interconnecting with said concave portion of said shank lying in a third line which intersects with said first line in a second obtuse angle greater than said first obtuse angle, said first plane intersecting with said second plane in an acute angle.

2. A fishhook structure comprising a shank formed with an eye or the like at one end and a hook at the other end, said hook having a rearwardly extending barb end arranged to one side of said shank, said shank comprising a convex portion lying in a first plane interconnected with a concave portion lying in a second plane, said concave portion facing the barb end of said hook, the part of said shank interconnecting said convex and concave portions of said shank lying in a first line which intersects with a second line passing through the part of said convex portion of said shank interconnected with said eye in a first angle between 120 to 160 degrees, the part of said hook interconnected with said concave portion of said shank lying in a third line which intersects with said first line in a second angle larger than said first angle, said barb end of said hook lying substantially in alignment with the axis of said second line, said first plane intersecting with said second plane in an acute angle.

3. A fishhook structure comprising a shank, means at one end of said shank for attaching the structure to auxiliary equipment, a hook at the other end of said structure, said hook having a rearwardly extending barb end arranged to one side of said shank, said shank comprising a convex portion lying in a first plane interconnected with a concave portion lying in a second plane, said concave portion facing the barb end of said hook, the part of said shank interconnecting said convex and concave portions of said shank lying in a first line which intersects with a second line passing through the part of said convex portion of said shank interconnected with said means in a first angle between 120 to 160 degrees, the part of said hook interconnecting with said concave portion of said shank lying in a third line which intersects with said first line in an angle larger than said first angle, said first plane intersecting with said second plane in an acute angle.

4. A fishing structure comprising a shank, means at one end of said shank for attaching the structure to auxiliary equipment, a hook at the other end of said structure, said hook having a rearwardly extending barb end arranged to one side of said shank, said shank comprising a convex portion lying in a first plane interconnected with a concave portion lying in a second plane, said concave portion facing the barb end of said hook, the part of said shank interconnecting said convex and concave portions of said shank lying in a first line which intersects with a second line passing through the part of said convex portion of said shank interconnected with said means in a first angle between 120 to 160 degrees, the part of said hook interconnecting with said concave portion of said shank lying in a third line which intersects with said first line in an angle approximately 15 degrees larger than said first angle, said first plane intersecting with said second plane in acute angle.

5. A fishing structure comprising a shank, means at one end of said shank for attaching the structure to auxiliary equipment, a hook at the other end of said structure, said hook having a rearwardly extending barb end arranged to one side of said shank, said shank comprising a convex portion lying in a first plane interconnected with a concave portion lying in a second plane, said concave portion facing the barb end of said hook, the vertex of said convex portion being located approximately one third of the length of the structure from said means, the part of said shank interconnecting said convex and concave portions of said shank lying in a first line which intersects with a second line passing through the part of said convex portion of said shank interconnected with said means in a first angle between 120 to 160 degrees, the part of said hook interconnecting with said concave portion of said shank lying in a third line which intersects with said first line in an angle larger than said first angle, said first plane intersecting with said second plane in an acute angle.

References Cited in the file of this patent

UNITED STATES PATENTS

| | | |
|---|---|---|
| 1,430,626 | Christensen | Oct. 3, 1922 |
| 1,513,011 | Russell et al. | Oct. 28, 1924 |
| 2,060,499 | Heidrich | Nov. 10, 1936 |
| 2,164,807 | Evans | July 4, 1939 |
| 2,261,433 | Demory | Nov. 4, 1941 |
| 2,233,338 | Brewer | Feb. 25, 1941 |

FOREIGN PATENTS

| | | |
|---|---|---|
| 202,923 | Great Britain | Aug. 30, 1923 |